UNITED STATES PATENT OFFICE.

MATJAS CZINER, OF NEW YORK, N. Y., ASSIGNOR OF PART OF HIS RIGHT TO JAMES BARKER AND SAMUEL LEVY, OF SAME PLACE.

IMPROVEMENT IN PROCESSES OF TREATING CORN MASH.

Specification forming part of Letters Patent No. 205,729, dated July 9, 1878; application filed August 3, 1877.

CASE A.

*To all whom it may concern:*

Be it known that I, MATJAS CZINER, of the city, county, and State of New York, am the inventor of an Improved Process of Treating Corn Mash for the Production of Wort, of which the following is a full, clear, and exact description.

My invention consists in the process of treating corn mash in which the mash is treated to heat in a closed vessel and the vapors of the spirit contained in the mash are more or less condensed in the said vessel and returned to the mash until the mash is raised to the boiling-point, when such condensation ceases, the heating being continued until the temperature of the mash is raised to about 220° Fahrenheit, as hereinafter particularly set forth and described.

In carrying out my invention, I proceed as follows:

Corn mash which has been properly prepared in the usual manner is taken in a sufficient quantity and introduced into a closed vessel through a pipe or opening, which is then hermetically closed. The mash is placed at the bottom of the vessel, and should fill the vessel or chamber in which it is to be cooked about one-third full, as hereinafter set forth. Heat is now applied to the body of the mash in the vessel, and this may be conveniently accomplished by a steam-coil immersed in the body of the mash at the bottom of the vessel, and through which dry or superheated steam is circulated. The body of the mash, being gradually warmed by the steam-coil, will give off vapors of the spirit or alcohol contained in the mash. These vapors are condensed more or less and returned to the body of the heating mash. This is conveniently accomplished by means of a coil of pipe in the closed vessel, which opens from the top of the chamber in which the mash is being heated, and is arranged in a chamber placed above said heating-chamber, the said coil having a continuing pipe depending into the heating-chamber and down into the mash. When the mash reaches the boiling-point this condensation and return of the spirit-vapors ceases, as the pressure of the boiling mash is equal at both ends or openings of the coil. The heating is continued, and the boiling of the mash takes place in the lower chamber, causing a pressure therein, which dissolves and disintegrates the mash, separating its liquid from its solid matters. The heating is continued until the temperature of the mash is raised to about 220° Fahrenheit.

To prevent the bursting of the heating-chamber, and at the same time to secure the violent agitation of the mash, I permit the pressure of the steam in the heating-chamber to drive the boiling mash into the closed chamber above it, in which is the condensing-coil. This is conveniently accomplished by means of tubes extending from near the bottom of the heating-chamber, where they are immersed in the body of the mash, to the upper chamber, and opening into it. The entrance of the boiling mash into said upper chamber will, of course, rapidly heat the said chamber and its contained coil, and thus check the condensation of the spirit-vapors in said coil.

When the temperature of the mash has risen to about 220° Fahrenheit the heat is cut off, and the mash will thereupon cool, and in so doing all the products of its partial distillation and its boiling under pressure will fall back into the lower chamber and mix with the body of the mash. When the mash has settled, the solid portions falling to the bottom, the liquid may be drawn off and used in making vinegar or beer.

I do not intend to claim hereunder the arrangement of apparatus to which I incidentally refer, as I reserve the same for a separate application for Letters Patent.

What I claim as my invention, and desire to secure by Letters Patent, is—

The process of treating corn mash in which the mash is treated to heat in a closed vessel and the vapors of the spirit contained in the mash are more or less condensed in the said vessel and returned to the mash until the mash is raised to the boiling-point, when the condensation ceases, the heating being continued until the temperature of the mash is raised to about 220° Fahrenheit, as described.

MATJAS CZINER.

Witnesses:
B. S. CLARK,
A. S. FITCH.